US009580605B2

(12) United States Patent
Wimmer et al.

(10) Patent No.: US 9,580,605 B2
(45) Date of Patent: Feb. 28, 2017

(54) PROCESS TO PREPARE SURFACE-MODIFIED MINERAL MATERIAL, RESULTING PRODUCTS AND USES THEREOF

(75) Inventors: Guenter Wimmer, Meerbusch (DE); Joachim Schölkopf, Killwangen (CH); Hans-Joachim Weitzel, Suhr (CH); Fridolin Stauffer, legal representative, Unterentfelden (CH)

(73) Assignee: Omya International AG, Oftringen (CH)

(*) Notice: Subject to any disclaimer, the term of this patent is extended or adjusted under 35 U.S.C. 154(b) by 32 days.

(21) Appl. No.: 13/640,325

(22) PCT Filed: Apr. 7, 2011

(86) PCT No.: PCT/EP2011/055405
§ 371 (c)(1),
(2), (4) Date: Dec. 3, 2012

(87) PCT Pub. No.: WO2011/128242
PCT Pub. Date: Oct. 20, 2011

(65) Prior Publication Data
US 2013/0137779 A1    May 30, 2013

Related U.S. Application Data

(60) Provisional application No. 61/343,128, filed on Apr. 23, 2010.

(30) Foreign Application Priority Data

Apr. 16, 2010    (EP) ..................................... 10160235

(51) Int. Cl.
| | | |
|---|---|---|
| *A61K 8/25* | (2006.01) | |
| *A61Q 1/02* | (2006.01) | |
| *C09C 1/02* | (2006.01) | |
| *A61K 47/00* | (2006.01) | |
| *C09C 1/42* | (2006.01) | |

(52) U.S. Cl.
CPC .............. *C09C 1/022* (2013.01); *C09C 1/021* (2013.01); *C09C 1/028* (2013.01); *C09C 1/42* (2013.01); *C01P 2004/61* (2013.01); *C01P 2004/62* (2013.01); *C01P 2006/12* (2013.01); *C01P 2006/88* (2013.01)

(58) Field of Classification Search
None
See application file for complete search history.

(56) References Cited

U.S. PATENT DOCUMENTS

| | | | |
|---|---|---|---|
| 4,186,028 A | 1/1980 | Woditsch et al. | |
| 4,207,186 A | 6/1980 | Wang et al. | |
| 4,367,207 A * | 1/1983 | Vanderheiden | 423/432 |
| 4,497,713 A * | 2/1985 | Geiger | 210/699 |
| 4,641,696 A | 2/1987 | Semin et al. | |
| 4,802,990 A | 2/1989 | Inskeep, Jr. | |
| 4,892,902 A * | 1/1990 | Shioji et al. | 524/417 |
| 6,123,855 A | 9/2000 | Hansen et al. | |
| 6,666,953 B1 | 12/2003 | Gane et al. | |
| 2002/0096271 A1 | 7/2002 | Croft | |
| 2004/0020410 A1 | 2/2004 | Gane et al. | |
| 2005/0096233 A1 | 5/2005 | Hurtevent et al. | |
| 2006/0162884 A1 | 7/2006 | Gane et al. | |
| 2007/0266898 A1 | 11/2007 | Gane et al. | |
| 2008/0022901 A1 | 1/2008 | Buri et al. | |

FOREIGN PATENT DOCUMENTS

| | | |
|---|---|---|
| DE | 4404219 A1 | 8/1995 |
| FR | 2765495 A1 | 1/1999 |
| JP | 04013780 A | 1/1992 |
| WO | 8503065 A1 | 7/1985 |
| WO | 02089991 A2 | 11/2002 |
| WO | 2004066731 A1 | 8/2004 |
| WO | 2009056942 A1 | 5/2009 |
| WO | 2009074492 A1 | 6/2009 |

OTHER PUBLICATIONS

International Search Report, dated Apr. 5, 2011 for PCT Application No. PCT/EP2011/055405.
Written Opinion of the International Searching Authority, dated Apr. 5, 2011 for PCT Application No. PCT/EP2011/055405.
Jayswal et al. "Synthesis and Characterization of a Novel Metal Phosphonate, Zirconium (IV)-Hydroxy Ethylidene Diphosphonate, and its Application as an Ion Exchanger." Turk. J. Chem. 32 (2008), 63-74.
English Translation of Office Action dated Jan. 7, 2014 for JP2013-504201.

* cited by examiner

*Primary Examiner* — San-Ming Hui
*Assistant Examiner* — Andrew Lee
(74) *Attorney, Agent, or Firm* — Amster, Rothstein & Ebenstein LLP

(57) ABSTRACT

The present invention refers to a process to modify at least part of the surface of at least one mineral material, and to the use, as an additive in an aqueous suspension of mineral materials having a pH between 5 and 10, of at least one agent, wherein the additive allows for the formation of a low volume, high solids content filter or centrifuge cake on dewatering the suspension.

36 Claims, No Drawings

PROCESS TO PREPARE SURFACE-MODIFIED MINERAL MATERIAL, RESULTING PRODUCTS AND USES THEREOF

CROSS-REFERENCE TO RELATED APPLICATIONS

This application is a U.S. national phase of PCT Application No. PCT/EP2011/055405, filed Apr. 7, 2011, which claims priority to European Application No. 10160235.7, filed Apr. 16, 2010 and U.S. Provisional Application No. 61/343,128, filed Apr. 23, 2010.

The present invention relates to the field of technologies implemented in order to modify the surface of mineral materials, notably in order to facilitate their dewatering and application following dewatering.

A first object of the present invention resides in a process to modify at least part of the surface of at least one mineral material, comprising the following steps:

Step a) providing at least one mineral material in the form of an aqueous cake or suspension, said cake or suspension having a pH between 5 and 10;

Step b) adding at least one agent to said mineral material(s) of Step a);

Step c) obtaining a suspension of said mineral material(s) having a pH which is less than 10 and which is greater than 7 if the isolelectric point of said mineral material of Step a) is greater than 7 and is greater than the isolelectric point of said mineral material of Step a) if said isolelectric point is 7 or lower;

characterised in that:
said agent is:
in the form of an aqueous solution or a stable aqueous colloid having a pH of less than 6;
formed by mixing, in an aqueous environment, at least one phosphonic acid-comprising compound with one or more metal cations or metal-comprising cationic compounds, where said metal is selected from the group consisting of: aluminium, zirconium, zinc, cobalt, chrome, iron, copper, tin, titanium and mixtures thereof, and where said phosphonic acid-comprising compound and said metal cations or metal-comprising cationic compounds are dosed such that the molar ratio of phosphonate hydroxyl groups: metal cation or metal comprising cationic compound is from 10:1 to 2:1; and
provided in step b) in an amount corresponding to from 0.04 to 1 mg by dry weight of agent per m²o of mineral materials specific surface area.

A second object of the present invention is a product obtained by the inventive process.

A third object of the present invention is a process wherein the product obtained by the inventive process, in the form of a suspension, is dewatered to form a low volume filter or centrifuge cake.

A fourth object of the present invention refers to the use, as an additive in an aqueous suspension of mineral materials having a pH between 5 and 10, of at least one agent:
in the form of an aqueous solution or a stable aqueous colloid having a pH of less than 6;
formed by mixing, in an aqueous environment, at least one phosphonic acid-comprising compound with one or more metal cations or metal-comprising cationic compounds, where said metal is selected from the group consisting of: aluminium, zirconium, zinc, cobalt, chrome, iron, copper, tin, titanium and mixtures thereof, and where said phosphonic acid-comprising compound and said metal cations or metal-comprising cationic compounds are dosed such that the molar ratio of phosphonate hydroxyl groups: metal cation or metal comprising cationic compound is from 10:1 to 2:1; and
in an amount corresponding to from 0.04 to 1 mg by dry weight of agent per m² of the total surface of the mineral material.

characterised in that this additive leads to the formation of a low volume, high solids content filter or centrifuge or sedimentation cake on dewatering the suspension.

For the purpose of the present invention, the isoelectric point of a mineral material is the pH at which the mineral material surface carries no charge and is evaluated by the measurement method provided in the examples section herebelow.

For the purpose of the present Application, phosphonic acids comprise at least one —$PO(OH)_2$ group, where this group(s) is linked to the remaining molecule via a covalent P—C bond. Phosphonic acid may be non-polymeric, or pendant phosphonic acid groups may appear along polymer chains, for example introduced therein via monomers comprising phosphonic acid groups.

For the purpose of the present Application, the equilibrium pH of a mineral material is measured at 25° C. according to the measurement method provided in the examples section hereafter. All other pH values are likewise measured at 25° C. according to the measurement method provided in the examples section herebelow.

To adjust the solids content of an aqueous mineral material-comprising suspension or, more commonly, to limit volume- or weight-related transportation costs, aqueous mineral material-comprising suspensions are often partially or fully dewatered by a filtration, centrifugation or evaporation process.

Filtration processes serve to separate fluid from solid components by interposing a medium through which only the fluid can pass. The passage of the fluid through the medium may be assisted by the application of pressure on the suspension in the direction of the filtration medium, or by the creation of a vacuum downstream from the filter.

Even when filtration is performed to an extent that no further fluid passes through the filtration medium, the solid material retained on the filter may still comprise a fraction of fluid. Reduction of the moisture content of a filtered mineral material and increasing the compactness of the cake may be desirable for many reasons, which include: improved recovery from the filter chamber, reduction in transportation and handling costs and reduction of the energy cost of subsequent thermal drying.

On the other hand, subsequent to recovery of mineral material in the form of a cake following a filtration step, this material must present certain characteristics. If it is to be reintroduced into an aqueous environment, the mineral material must be rapidly wettable. If any reaction at the mineral material's surface is to take place, this surface environment must be adapted to support these reactions.

The Applicant has identified that mineral material recovered on a filter following the filtration of an aqueous suspension of this mineral material retains water according to the following mechanisms.

Firstly, if the mineral material particles feature any pores, water may be retained in the pore volume of this material. Such water is termed "intra-particle pore water".

Secondly, it is well know that mineral materials, such as calcium carbonate, develop or maintain a surface hydration layer in the presence of sufficient moisture. The water in this hydration layer may be retained at the surface by localized attractive forces, as the water molecules orient themselves to compensate the punctual positive or negative charges along the mineral material's surface, thereby lowering the effective surface energy of the mineral material. Reference is made in this respect to the doctoral thesis entitled "Observation and Modelling of Fluid Transport into Porous Paper Coating Structures" by Dr. Joachim Schölkopf (University of Plymouth, 2002). Such water is referred to as "hydration layer water".

Thirdly, due to capillary and other forces, water in a dense particle matrix will be retained in the pores physically formed by the spaces existing between the particles. Such water is termed "inter-particle pore water".

The Applicant has realized that in order to perform an efficient filtration while obtaining a mineral material that is suitable for certain subsequent applications, it may be advantageous to favor the maximum removal of inter-particle pore water in a dense cake, while maintaining the hydration layer.

Indeed, according to recent scientific publications, such as "Change in Surface Properties of Heavy Calcium Carbonate with Surface Hydration" by FUJI MASAYOSHI et al. (*Inorganic Materials*, volume 6; no. 282; pages 348-353 (1999)) and "Calcite (1014) surface in humid environments" by J. Baltrusaitis et al. (*Surface Science* (5 Jul., 2009)), it has been shown that a surface hydration layer is often necessary to support the adsorption of additives at the surface of a mineral material such as calcium carbonate. Additionally, the water of the hydration layer may be needed to catalyze or enable certain surface reactions. Moreover, a mineral material particle already including a surface hydration layer is far more easily introduced into an aqueous environment than an entirely dry particle.

The Applicant has surprisingly found that an aqueous suspension of mineral material, which may be prepared by the process of the invention implementing a selected phosphonic acid-based additive, may be dewatered to form a volume-wise small filter or centrifuge cake having a high solids content while maintaining an effective surface hydration layer on the particles.

The prior art referring to the dewatering of aqueous suspensions of mineral materials includes U.S. Pat. No. 4,207,186, which refers to the dewatering of mineral concentrates using a synergistic mixture of a hydrophobic alcohol having 8 to 18 carbon atoms, and a non-ionic surfactant that is especially an alcohol ethoxylate, to significantly lower the residual water content of the obtained filter cake.

WO 85/03065 likewise refers to the separation of mineral particles from an aqueous phase using certain non-ionic surfactants based on relatively low molecular weight block copolymers of ethylene oxide and butylene oxide.

U.S. Pat. No. 6,123,855 also mentions non-ionic surfactants as calcium carbonate slurry dewatering aids, such surfactants being especially a polyalkylene glycol ether, an alcohol alkoxylate or an alkylphenolhydroxypolyoxyethylene.

US 2002/0096271 describes a process implementing an alkyleneamine additive to enhance water-removal from sodium carbonate-comprising lime mud.

It is of note that dewatering agents as intended in the present invention are not to be confused with clarifying, flocculating or coagulating agents, which act according to a different mechanism leading to a different result. Such clarifying, flocculating or coagulating chemicals coagulate or flocculate suspended solids into large agglomerated particles, which then settle by gravity or otherwise to form a cake. Such cakes tend not to be dense since the packing of large flocs is generally poor, implying large inter-floc pore volume.

The addition of the particular agent of the present invention does not result in the clarification of the suspension, and spontaneous formation of a cake due to gravitational settling of formed flocs. Advantages of the present invention may be observed when following addition of the selected phosphonate system according to the inventive process, the suspension is filtered to form a low volume, high solids content filter cake wherein the particles maintain a surface hydration layer.

Nonetheless, it is not to be understood that the invention requires the filtration step to take place. The Applicant considers that the material resulting from the process of the invention is itself of broader interest, the dewatering improvement being only one among many possible advantageous features of the resulting product.

Phosphonic acids, and their salts, are known metal chelants, which when dosed in the appropriate amount, also in the form of esters, may serve as scale inhibitors in aqueous systems by inhibiting the precipitation of calcium salts, according, for example, to U.S. Pat. No. 4,802,990, wherein 1-hydroxyethane 1,1-diphosphonic acid (HEDP) is used in combination with a second acid for this purpose in an aqueous environment, or to US 2005/0096233, wherein calcium carbonate and barium sulphate deposition in oil wells is inhibited by implementation of a polymer featuring pendant phosphonate groups. U.S. Pat. No. 4,802,990 mentions their use to dissolve mineral salts. Their application as corrosion inhibitors is also common. They may be found as components of fertilizers. Organophosphonates are additionally known as mineral flotation agents, according to, for example, WO 02/089991. Certain phosphonates or phosphonocarboxylic acids may influence the form of precipitated calcium carbonate when dosed partway through the precipitation process, according to EP 1 151 966. Such compounds may additionally be employed in fluidising systems, as described in FR 2 393 037, DE 44 04 219, FR 2 393 037 and FR 2 765 495.

Among the documents referring to this latter technical problem, FR 78 16616 refers to the mixture of pigments with 0.01 to 5% by weight of phosphonocarboxylic acid, or their salts, as dispersant in an aqueous environment to obtain a suspension having a solids content of from 30 to 80% by weight. In Example 1 of this patent application, titanium dioxide is treated with aluminium oxide and then ground and mixed with a number of additives, among which is 2-phosphonobutane-1,2,4-tricarboxylic acid, to form a high solids content suspension that is stable over time. The Applicant would first mention that current methodologies used to surface treat titanium dioxide with aluminium oxide generally require the implementation of a strong acid in combination with an aluminium salt, such as sodium aluminate; such a treatment is not an option for acid sensitive materials such as calcium carbonate. Moreover, aluminium oxide is not water soluble, even under acidic conditions, and therefore any aluminium oxide on the titanium dioxide surface of FR 78 16616 cannot be used as an adduct to form the water-soluble chelate complex according to the present invention.

As such, none of the above documents disclose or even suggest the specific and advantageous process and product of the present invention.

A first object of the present invention resides in a process to modify at least part of the surface of at least one mineral material, comprising the following steps:

Step a) providing at least one mineral material in the form of an aqueous cake or suspension, said cake or suspension having a pH between 5 and 10;

Step b) adding at least one agent to said mineral material(s) of Step a);

Step c) obtaining a suspension of said mineral material(s) having a pH which is less than 10 and which is greater than 7 if the isolelectric point of said mineral material of Step a) is greater than 7 and is greater than the isolelectric point of said mineral material of Step a) if said isolelectric point is 7 or lower;

characterised in that:

said agent is:

in the form of an aqueous solution or a stable aqueous colloid having a pH of less than 6;

formed by mixing, in an aqueous environment, at least one phosphonic acid-comprising compound with one or more metal cations or metal-comprising cationic compounds, where said metal is selected from the group consisting of: aluminium, zirconium, zinc, cobalt, chrome, iron, copper, tin, titanium and mixtures thereof, and where said phosphonic acid-comprising compound and said metal cations or metal-comprising cationic compounds are dosed such that the molar ratio of phosphonate hydroxyl groups: metal cation or metal comprising cationic compound is from 10:1 to 2:1; and provided in step b) in an amount corresponding to from 0.04 to 1 mg by dry weight of agent per $m^2$ of the total surface of the mineral material.

Without wishing to be bound to any theory, the Applicant believes that the agent employed in the present invention forms a deposit in an advantageous manner on the surface of the mineral material, passing via the intermediate formation of a chelate complex on contacting the mineral material environment having a pH of greater than 5. For the purpose of the present Application, a "chelate complex" shall be understood to represent a complex, in which a chelant is coordinated via at least two ligand groups to a metal ion or a metal containing cationic compound, so that there is a ring of atoms including the metal cation or the metal in the form of a cationic compound. A phosphonic acid-comprising compound, or salt or ester thereof, is a chelant if it is a bis- or multi-phosphonic acid group-comprising compound, or if in addition to a phosphonic acid group one or more further ligands (such as a carboxyl group) are present which form a metal-ligand association.

Step a)

Step a) of the present invention refers to providing at least one mineral material in the form of an aqueous cake or suspension, said cake or suspension having a pH between 5 and 10

Said suspension may be formed by suspending said mineral material provided in the form of a powder.

A cake is understood to refer to a cake formed on a filter medium following filtration, following centrifugation, or following sedimentation and decantation of an aqueous suspension of at least one mineral material.

In a preferred embodiment, said suspension or cake has a pH of between 7 and 10. Even more preferably, this pH lies between 8 and 9.

Said mineral material is preferably calcium and/or magnesium-comprising mineral material.

Said mineral material is preferably a carbonate and/or gypsum and/or dolomite. Even more preferably, said mineral material is a carbonate.

In particular, said mineral material is preferably selected from the group consisting of dolomite, calcium carbonate, Group IIA and/or IIIA element-comprising phyllosilicates such as montmorillonite and talc, magnesite, magnesium-comprising chlorite, kaolin clay, and mixtures thereof.

Said mineral material is most preferably a calcium carbonate. Calcium carbonate may be a ground natural calcium carbonate, a precipitated calcium carbonate, a surface-reacted calcium carbonate, or a mixture thereof.

"Ground natural calcium carbonate" (GNCC) in the meaning of the present invention is a calcium carbonate obtained from natural sources, such as limestone, marble or chalk, and processed through a wet and/or dry treatment such as grinding, screening and/or fractionising, for example by a cyclone or classifier.

"Precipitated calcium carbonate" (PCC) in the meaning of the present invention is a synthesized material, generally obtained by precipitation following reaction of carbon dioxide and lime in an aqueous environment or by precipitation of a calcium and carbonate ion source in water. PCC may be metastable vaterite, stable calcite or aragonite.

Said GNCC or PCC may be surface reacted to form a surface-reacted calcium carbonate, which are materials comprising GNCC and/or PCC and an insoluble, at least partially crystalline, non-carbonate calcium salt extending from the surface of at least part of the calcium carbonate. Such surface-reacted products may, for example, be prepared according to WO 00/39222, WO 2004/083316, WO 2005/121257, WO 2009/074492, unpublished European patent application with filing number 09162727.3, and unpublished European patent application with filing number 09162738.0.

Said aqueous suspension or cake of Step a) preferably comprises less than 0.1% by weight, based on the weight of dry mineral material, of a polyacrylate-based dispersant.

Said mineral material preferably has a BET specific surface area, measured in accordance with the measurement method described in the examples section hereafter, of between 5 and 150 $m^2/g$, preferably of between 5 and 60 $m^2/g$, and more preferably of between 10 and 50 $m^2/g$.

Said mineral material preferably has a weight median diameter ($d_{50}$), measured in accordance with the measurement method described in the examples section hereafter, of between 0.2 and 5 μm, and preferably of between 0.5 and 2 μm.

In the case of an aqueous suspension, the solids content, as measured according to the method provided in the Examples section herebelow, may range from 1 to 85% by weight, but preferably lies between 10 and 80% by weight, based on the weight of the suspension.

In the case of a cake, the solids content is generally between 20 and 80% by weight, is preferably between 40 and 75% by weight, and even is more preferably between 50 and 70% by weight.

Step b)

Step b) refers to adding at least one agent to said mineral material(s) of Step a), said agent being:

in the form of an aqueous solution or a stable aqueous colloid having a pH of less than 6;

formed by mixing, in an aqueous environment, at least one phosphonic acid-comprising compound with one or more metal cations or metal-comprising cationic compounds, where said metal is selected from the group consisting of: aluminium, zirconium, zinc, cobalt, chrome, iron, copper, tin, titanium and mixtures thereof, and where said phosphonic acid-comprising compound and said metal cations or metal-comprising cationic compounds are dosed such that the molar ratio of phosphonate hydroxyl groups: metal cation or metal comprising cationic compound is from 10:1 to 2:1; and provided in step b) in an amount corresponding to from 0.04 to 1 mg by dry weight of agent per m$^2$ of the total surface of the mineral material.

For the purpose of the present invention, a stable aqueous colloid is a multiphase system in which at least one phase is finely distributed but not molecularly dissolved within the other phase in a way that the system is structurally stable, i.e. no sedimentation, agglomeration, aggregation, flotation. Typically aqueous colloids scatter light.

Preferably, said agent is dosed in an amount corresponding to from 0.1 to 0.75 mg by dry weight of agent per m$^2$ of the total surface of the mineral material.

In another embodiment, said agent is preferably dosed in an amount corresponding to from 0.1 to 5%, more preferably from 0.15 to 0.75%, and even more preferably from 0.15 to 0.5% by dry weight relative to the dry weight of mineral material.

Preferably, said agent is provided in the form of an aqueous solution having a pH of between 0 and 5, and more preferably of between 0.5 and 4.5.

The metal cations of said agent can be part of a compound.

For certain metal cations selected from aluminium, zirconium, zinc, cobalt, chrome, iron, copper, tin, titanium and mixtures thereof, the skilled man will recognise that freshly synthesised hydroxides may be advantageously employed. Advantages may also be observed using metal cations that have been buffered with nitric, sulphuric, oxalic acid or other appropriate buffer systems. In the case of titanium, this is advantageously provided in the form of titanyl sulphate.

Said phosphonic acid-comprising compound is preferably an alkyl diphosphonic acid, a particularly preferred alkyl diphosphonic acid being 1-hydroxyethane 1,1-diphosphonic acid (HEDP).

Other diphosphonic acids that may employed in the present invention include methylene diphosphonic acid (MDP), hydroxymethylene diphosphonic acid (HMDP), hydroxycyclomethylene diphosphonic acid (HCMDP), and 1-hydroxy-3-aminopropane-1,1-diphosphonic acid (APD).

Said phosphonic acid-comprising compound may be a triphosphonic acid, such as aminotri(methylenephosphonic acid) (ATMP), or one or more compounds including a higher number of phosphonic acid groups, such as diethylenetriaminepenta(methylenephosphonic acid) (DTPMP).

It is also possible for said phosphonic acid-comprising compound to include further groups, such as carboxylic acid groups. An example of such a phosphonic acid-comprising compound is phosphonosuccinic acid (PSA), In a preferred embodiment, the metal of said metal cation or metal-comprising cationic compound is selected from the group consisting of: aluminium and zirconium.

In a most preferred embodiment, said agent is formed by mixing aluminium and/or zirconium cations, preferably provided in the form of hydroxides, with HEDP (forming Al-HEDP and Zr-HEDP, respectively).

In a preferred embodiment, said agent is provided in the form of an aqueous solution or colloidal suspension having a dry weight of from 5 to 70%.

Al-HEDP and Zr-HEDP may, for example, be formed by adding the corresponding aluminium or zirconium hydroxide (optionally in the form of a powder) into an aqueous solution comprising HEPD. In one embodiment, this solution comprises 5 to 20% by dry weight, relative to the weight of the solution, of HEDP. In such a case, the aluminium or zirconium hydroxide is added in such an amount so as to form a final solution of agent having 1 to 25 equivalent weight parts of aluminium or zirconium on the total solution weight.

In one preferred embodiment, Al-HEDP is formed by dosing Al(OH)$_3$: HEDP in a 1:5 to 1:8 weight ratio.

It is to be understood that further additives having a basic character, such as an alkali-HEDP salt (such as Na-HEDP or K-HEDP) may be present in addition to said agent, provided that said agent is in an aqueous environment having a pH of less than 6 when introduced in the process.

Step b) may implement the further addition of water in order to meet a preferred water: mineral material ratio of 95:5 to 10:90 in Step c). If water is added, it may be added in combination with said agent, and indeed may even represent an aqueous solvent of said agent.

Step b) is preferably performed under mixing.

In one alternative embodiment, said agent may be formed in situ in the mineral material suspension. It is however more preferred to form said agent prior to its addition to the mineral material suspension.

Base B

Because said agent implemented in Step b) is acidic, it may be necessary, in order to fall into the final suspension pH range of Step c), which is greater than 7 and in any case must be greater than the isoelectric point of said mineral material of Step a), and is less than 10, to add a base (hereafter "Base B"), before and/or during and/or after addition of said agent.

For the purpose of the present invention, an "acid" and a "base" shall be understood to represent, respectively, acids and bases in accordance with the Bronsted acid-base theory; that is to say, an acid is a proton donor and a base is a proton acceptor, leading, respectively, to a pH decrease and increase when dissolved in water.

It is of note that Base B may be added simultaneously with said agent, though this route is less preferred.

If Base B is added before said agent, said agent is preferably added once the pH following addition of Base B has stabilised.

Likewise, if said agent is added first, Base B is preferably added once the pH of the suspension is stable.

It is also possible that a part of Base B is added prior to all or part of said agent, and that the remaining Base B is added after the addition of all or part of said agent.

Base B is preferably selected from among sodium silicate, sodium hydroxide, potassium hydroxide, lithium hydroxide, sodium aluminate, basic polyphosphates, basic phosphonates and mixtures thereof, and is more preferably a basic polyphosphate or a basic phosphonate, said basic polyphosphate being preferably a pyrophosphate and especially a potassium salt of pyrophosphate, and said basic phosphonate being preferably an alkali compound of HEDP, such as a sodium and/or potassium and/or lithium compound of HEDP.

If all of Base B is added prior to said agent, it is preferred that Base B be added in an amount so as to reach a mineral material cake or suspension pH of greater than 10.

Base B is preferably added in an amount of greater than or equal to 0.1% by dry weight, and preferably from 0.2 to 0.5% by dry weight, relative to the dry weight of mineral material.

It may be advantageous that Base B presents a high buffering capacity, such that a relatively high amount of acidic agent can be added before reaching a pH of between 6.5 and 10.

In a particular preferred embodiment, Base B is a potassium pyrophosphate or a sodium and/or potassium and/or lithium compound of HEDP in the form of an aqueous solution.

Additional Process Steps

In one embodiment of the process of the present invention, the mineral material may be ground prior to, during or following addition of said agent and/or said Base B.

Obtained Mineral Material in Suspension

The suspension obtainable by the process of the invention preferably has a pH of between 7.5 and 9.0.

This suspension may, in one embodiment, subsequently be filtered on a filtration medium to form a filter cake of surface-modified mineral material. For example, the suspension may be filtered on a filter paper having a 3 µm pore size.

This suspension may alternatively be centrifuged to form a centrifuge cake of surface-modified mineral material.

This suspension may alternatively be concentrated by thermal or mechanical methods.

The obtained filter cake or centrifuge cake preferably has a solids content of between 40 and 80% by weight.

The obtained filter cake or centrifuge cake may additionally be dried to form a dry surface-modified mineral material. Such a dry surface-modified mineral material features a water pick-up, measured according to the measurement method given in the examples section herebelow, of between 0.3 and 1.0%, and preferably of between 0.3 and 0.5%.

The obtained suspension or dry product may find applications in, among other applications, paper, including in the base paper and/or paper coating, plastics and especially thermoplastics, sealants such as silicone sealants, paints, concretes and cosmetics. The skilled man will recognise that the suspension or dry product further presents the general advantage of not being based on oil-based products. When implemented in plastic applications, the dry product moreover does not lead to the emission of volatile products on processing at temperatures typical of the plastics industry, i.e. from 150 to 300° C.

The obtained suspension or dry product may be furthermore used as an intermediate product that is further processed. For example, the obtained suspension or dry product may be ground with further materials such as a binder as described in WO 2006/008657.

EXAMPLES

Measurement Methods

Solids Content of a Suspension or Dispersion (% by Weight)

Solids contents were determined using a Mettler LP16 PM100 mass balance equipped with an LP16 IR dryer.

pH of a Suspension or Dispersion

Suspension or dispersion pH values were measured using Seven Multi instrumentation from Toledo at 25° C.

Specific Surface Area (SSA) of a Particulate Material ($m^2/g$)

The specific surface area was measured using Gemini V instrumentation from Micrometrics, via the BET method according to ISO 9277 using nitrogen, following conditioning of the sample by heating at 250° C. for a period of 30 minutes.

Particle Size Distribution (Mass % Particles with a Diameter <X) and Weight Median Grain Diameter ($d_{50}$) of a Particulate Material Weight median grain diameter and grain diameter mass distribution of a particulate material were determined via the sedimentation method, i.e. an analysis of sedimentation behaviour in a gravimetric field. The measurement is made with a Sedigraph™ 5120.

The method and the instrument are known to the skilled person and are commonly used to determine grain size of fillers and pigments. The measurement was carried out in an aqueous solution of 0.1 wt % $Na_4P_2O_7$. The samples were dispersed using a high speed stirrer and ultrasonic.

Isoelectric Point of a Mineral Material

The isoelectric point of a mineral material is evaluated in deionised water at 25° C. using Malvern Zetasizer Nano ZS instrumentation.

Water Pick-Up of a Particulate Material

The water pick-up of a particulate material is determined by first drying the material in an oven at 110° C. to constant weight, and thereafter exposing the dried material to an atmosphere of 80% relative humidity for 60 hours at a temperature of 20° C. The water pick-up corresponds to the % increase in weight of the material following exposure to the humid environment, relative to the dried material weight.

Materials

Precipitated calcium carbonate (PCC) was obtained by bubbling $CO_2$ gas through a 13 to 15° C. suspension of lime having a solids content of about 15% by dry weight and containing between 0.05 and 1% of a slaking additive. The obtained PCC suspension had a solids content of about 17% by dry weight and the PCC material had a specific surface area of between 10 and 12 $m^2/g$.

The surface-reacted calcium carbonate (SRGCC) was prepared in a 10 $m^3$ reactor. Dry natural calcium carbonate having a $d_{50}$ of 1 µm was filled into this vessel along with water to form a suspension having a solids content of 10% by dry weight. 25% phosphoric acid (calculated dry/dry, said phosphoric acid being provided in the form of a 30% solution) was then added to the vessel over a time period of 60 minutes under stirring. Thereafter, 20 kg of a lime suspension (200 L of a 10% suspension) was introduced into the vessel.

Potassium hydroxide (KOH), in the form of granules, was obtained from Fluka.

Potassium pyrophosphate ($K_4P_2O_7$), in the form of a 60% by dry weight aqueous solution, was obtained from Chemische Fabrik Budenheim.

1-Hydroxyethane-1,1-diphosphonic acid (HEDP), in the form of a 60% by dry weight aqueous solution, was obtained from Chemische Fabrik Budenheim.

Sodium pyrophosphate ($Na_4HEDP$), in the form of a 25% by dry weight aqueous solution, was obtained from Chemische Fabrik Budenheim.

Aluminium hydroxide ($Al(OH)_3$), sold under the commercial name Martinal® OL-107 in the form of a powder, was obtained from Martinswerk.

Potassium HEDP ($K_4HEDP$) was synthesized by adding 90 g of KOH to an aqueous solution of HEDP previously formed by adding 200 g of water to 108 g of the 60 weight % aqueous solution of HEDP under stirring. The obtained clear solution had a pH of 12.0 and a concentration of $K_4HEDP$ of 33.5 g/100 g of water.

Lithium HEDP ($Li_4HEDP$) was synthesized by adding 113 g of LiOH to 2 200 g of a 7% aqueous solution of HEDP under stirring. The obtained suspension had a pH of 11.6.

Al-HEDP chelate complexes, in the form of an aqueous colloidal solution in which the weight ratio of Al(OH)$_3$:HEDP was 1:5, 1:8 and 1:10, were prepared as follows: aluminium hydroxide powder was added to the 60% HEDP solution in the necessary amount with respect to the desired weight ratio under stirring until a homogeneous white suspension was obtained. This suspension was then heated under continued stirring (at approximately 500 rpm) until a colloidal suspension developed. The solution temperature was then allowed to settle to approximately 23° C. The final dry weight of each of the colloidal suspension was 62 to 65% and the final pH 1.8.

Sn-HEDP chelate complexes, in the form of an aqueous colloidal solution in which the weight ratio of Sn(OH)$_2$:HEDP was 1:4, were prepared as follows: Sn(OH)$_2$ was freshly synthesized by adding 75 mL of ammonia to an aqueous solution of 20 g of SnSO$_4$ in 100 g of water. The obtained suspension was filtered on a Buchner funnel filter to obtain a filter cake. This filter cake was then added to 100 g of an aqueous 60% HEDP solution under stirring until a homogeneous suspension was obtained. The suspension was subsequently heated to a temperature of between 90 and 95° C. under stirring at 500 rpm until a milky colloidal suspension developed. The suspension temperature was then allowed to cool to about 23° C. The final colloidal suspension had a solids content of 67% by dry weight and the final pH was 0.9.

Co-HEDP chelate complexes, in the form of an aqueous solution in which the weight ratio of Co(OH)$_2$:HEDP was 1:10, were prepared as follows: 9.3 g of Co(OH)$_2$ was added to 155 g of an aqueous 60% HEDP solution under stirring until a homogeneous suspension was obtained. The suspension was then heated to a temperature of between 90 and 95° C. under stirring at 500 rpm until a milky paste developed. The paste was then diluted with water to 27% by dry weight; the obtained solution had a violet colour and was allowed to cool to 23° C. The solution pH was of 0.85.

Ti-HEDP chelate complexes, in the form of an aqueous colloidal solution in which the weight ratio of Ti(SO$_4$)$_2$:HEDP was 1:5, were prepared as follows: 15 g of a 60% titanyl sulphate solution was added to 150 g of a 60% HEDP solution under stirring and heating to 95 to 98° C. until a clear colloidal suspension developed. The suspension was then allowed to cool to approximately 23° C. The final solids content of the suspension was 60% by dry weight and the final pH<1.

Example 1

Lab-Scale Examples

In this example, the process of the present invention is compared to prior art processes.

The additive system listed in the Table below is added under stirring using an IKA RW 20 stirrer at 500 rpm, to an aqueous suspension of 150 g of undispersed ground natural calcium carbonate suspension having an isoelectric point of about 9 and a specific surface area of approximately 11 m$^2$/g, and wherein 75% by dry weight of the particles have a diameter of less than 1 µm; the initial solids content of this suspension is 20% by dry weight.

Thereafter, each of the suspensions of Table 1 were filtered over a time period of 30 minutes using a 3 µm pore size Rotilabo round filter located in a Buchner funnel filter (70 mm in diameter; 30 mm in height) equipped with a 1 L vacuum flask connected via an M7 2C diaphragm vacuum pump from Vacuubrand GmbH (suction capacity: 2.4 m$^3$/h).

The solids contents of the resulting filter cakes are given in Table 1. The collected material in the filter cakes was then dried and the water-pick value determined.

TABLE 1

| Test | 1 | 2 | 3 | 4 |
|---|---|---|---|---|
| Invention (IN)/Prior Art (PA) | PA | PA | IN | IN |
| Type of Additive System | none | HEDP followed by Na$_4$HEDP | K$_4$HEDP followed by Al(OH)$_3$:HEDP 1:8 | K$_4$P$_2$O$_7$ followed by Al(OH)$_3$:HEDP 1:8 |
| Amount of Additive System (% by dry weight on dry weight of mineral material) | none | 0.25 HEDP + 0.20 Na$_4$HEDP for a total of 0.45 | 0.20 K$_4$HEDP + 0.20 Al(OH)$_3$:HEDP for a total of 0.40 | 0.20 K$_4$P$_2$O$_7$ + 0.20 Al(OH)$_3$:HEDP for a total of 0.40 |
| Amount of Agent (g dry agent/m$^2$ mineral material) | — | — | 0.18 mg Al(OH)$_3$:HEDP/m$^2$ CaCO$_3$ | 0.18 mg Al(OH)$_3$:HEDP/m$^2$ CaCO$_3$ |
| pH of mineral material suspension following additive system addition | — | 8.4 | 8.5 | 8.3 |
| Final filter cake solids content (% by weight) | 42.3 | 43.5 | 46.1 | 49.0 |
| Water pick up (% weight increase) | 0.24 | 0.28 | — | 0.36 |

The above table shows that relative to the untreated calcium carbonate, not only does the resulting filter cake present a significantly higher solids content, but further the obtained calcium carbonate material treated by the process of the invention (test 4) has a 50% greater degree of water pick-up, attesting to a greater natural hydration layer. Comparing tests 2 and 3 furthermore shows that only the process of the invention, implementing a chelate complex instead of a chelant alone, leads to the desired results.

Example 2

Lab-Scale Examples

This example illustrates various embodiments of the invention.

The additive systems listed in Tables 2 and 3 below are added, under stirring using a Dispermat dissolver at 1 500 rpm, to an aqueous suspension of 500 g of undispersed ground natural calcium carbonate having an isoelectric point of about 9 and a specific surface area of approximately 11 m$^2$/g, and wherein 75% by weight of the particles have a diameter of less than 1 µm; the initial solids content of this suspension is 70 to 75% by dry weight.

Thereafter, each of the suspensions of Tables 2 and 3 were filtered over a time period of 30 minutes using a 3 µm pore size Rotilabo round filter located in a Buchner funnel filter (70 mm in diameter; 30 mm in height) equipped with a 1 L vacuum flask connected via an M7 2C diaphragm vacuum pump from Vacuubrand GmbH (suction capacity: 2.4 m$^3$/h). In all cases, a compact high solids content filter cake was obtained in which the mineral maintained a hydration layer.

TABLE 2

| Test | 5 | 6 | 7 | 8 |
|---|---|---|---|---|
| Invention (IN)/Prior Art (PA) | IN | IN | IN | IN |
| Type of Additive System | $K_4P_2O_7$ followed by $Al(OH)_3$:HEDP 1:5 | $K_4$HEDP followed by $Al(OH)_3$:HEDP 1:5 | $Li_4$HEDP followed by $Al(OH)_3$:HEDP 1:5 | $Al(OH)_3$:HEDP 1:5 followed by $K_4P_2O_7$ |
| Amount of Additive System (% by dry weight on dry weight of $CaCO_3$) | 0.25 $K_4P_2O_7$ + 0.20 $Al(OH)_3$:HEDP for a total of 0.45 | 0.25 $K_4$HEDP + 0.20 $Al(OH)_3$:HEDP for a total of 0.45 | 0.25 $Li_4$HEDP + 0.20 $Al(OH)_3$:HEDP for a total of 0.45 | 0.20 $K_4P_2O_7$ + 0.25 $Al(OH)_3$:HEDP for a total of 0.45 |
| Amount of Agent (g dry agent/$m^2$ mineral material) | 0.18 mg $Al(OH)_3$:HEDP/$m^2$ $CaCO_3$ | 0.18 mg $Al(OH)_3$:HEDP/$m^2$ $CaCO_3$ | 0.18 mg $Al(OH)_3$:HEDP/$m^2$ $CaCO_3$ | 0.23 mg $Al(OH)_3$:HEDP/$m^2$ $CaCO_3$ |
| pH of mineral material suspension following additive system addition | 8.3 | 8.5 | 8.6 | 8.9 |

TABLE 3

| Test | 9 | 10 | 11 | 12 |
|---|---|---|---|---|
| Invention (IN)/Prior Art (PA) | IN | IN | IN | IN |
| Type of Additive System | $Na_4$HEDP followed by $Al(OH)_3$:HEDP 1:5 | $Ti(SO_4)_2$:HEDP 1:5 followed by $Na_4$HEDP | $K_4P_2O_7$ followed by $Sn(OH)_2$:HEDP 1:7 | $K_4P_2O_7$ followed by $Co(OH)_2$:HEDP 1:10 |
| Amount of Additive System (% by dry weight on dry weight of $CaCO_3$) | 0.10 $Na_4$HEDP + 0.18 $Al(OH)_3$:HEDP for a total of 0.28 | 0.75 $Ti(SO_4)_2$:HEDP + 0.25 $Na_4$HEDP for a total of 1.00 | 0.50 $K_4P_2O_7$ + 0.50 $Sn(OH)_2$:HEDP for a total of 1.00 | 0.20 $K_4P_2O_7$ + 0.20 $Co(OH)_2$:HEDP for a total of 0.40 |
| Amount of Agent (g dry agent/$m^2$ mineral material) | 0.16 mg $Al(OH)_3$:HEDP/$m^2$ $CaCO_3$ | 0.69 mg $Ti(SO_4)_2$:HEDP/$m^2$ $CaCO_3$ | 0.45 mg $Sn(OH)_2$:HEDP/$m^2$ $CaCO_3$ | 0.18 mg $Co(OH)_2$:HEDP/$m^2$ $CaCO_3$ |
| pH of mineral material suspension following additive system addition | 8.6 | 7.6 | 7.4 | 9.0 |

TABLE 4

| Test | 13 | 14 | 15 |
|---|---|---|---|
| Invention (IN)/Prior Art (PA) | IN | IN | IN |
| Type of Additive System | Premixture in a 1:1 weight ratio of $K_4P_2O_7$ and [$Al(OH)_3$:HEDP 1:5], pH 4 | Premixture in a 1:1 weight ratio of $K_4P_2O_7$ and [$Al(OH)_3$:HEDP 1:5], pH 4 | Premixture of KOH and [$Al(OH)_3$:HEDP 1:5], pH 3.7 |
| Amount of Additive System (% by dry weight on dry weight of $CaCO_3$) | 0.4 of the premixture | 0.3 of the premixture | 0.4 of the premixture |
| Amount of Agent (g dry agent/$m^2$ mineral material) | 0.18 mg $Al(OH)_3$:HEDP/$m^2$ $CaCO_3$ | 0.14 mg $Al(OH)_3$:HEDP/$m^2$ $CaCO_3$ | — |
| pH of mineral material suspension following additive system addition | 8.5 | 8.7 | 8.1 |

Example 3

Lab-Scale Examples

This example illustrates various embodiments of the invention.

The additive systems listed in Table 5 below are added, under stirring using a Dispermat dissolver at 1 500 to 5 000 rpm, to an aqueous suspension of 500 g of the indicated mineral material; the initial solids content of this suspension is 40 to 42% by dry weight.

Thereafter, each of the suspensions of Table 6 were filtered over a time period of 30 minutes using a 3 μm pore size Rotilabo round filter located in a Buchner funnel filter (70 mm in diameter; 30 mm in height) equipped with a 1 L vacuum flask connected via an M7 2C diaphragm vacuum pump from Vacuubrand GmbH (suction capacity: 2.4 $m^3$/h). In all cases, a compact high solids content filter cake was obtained in which the mineral maintained a hydration layer.

TABLE 5

| Test | 16 | 17 | 18 | 19 |
|---|---|---|---|---|
| Invention (IN)/Prior Art (PA) | IN | IN | IN | IN |
| Type of mineral material | PCC | SRGCC | Talc | Talc |
| Mineral material specific surface area ($m^2$/g) | 18 | 30 | 45 | 45 |
| Type of Additive System | $K_4$HEDP followed by $Al(OH)_3$:HEDP 1:5 | $K_4$HEDP followed by $Al(OH)_3$:HEDP 1:5 | $K_4P_2O_7$ followed by $Al(OH)_3$:HEDP 1:10 | $K_4P_2O_7$ followed by $Al(OH)_3$:HEDP 1:10 |
| Amount of Additive System (% by dry weight on dry weight of $CaCO_3$) | 0.5 $K_4$HEDP + 0.17 $Al(OH)_3$:HEDP for a total of 0.67 | 0.2 $K_4$HEDP + 0.17 $Al(OH)_3$:HEDP for a total of 0.37 | 0.2 $K_4P_2O_7$ + 0.2 $Al(OH)_3$:HEDP for a total of 0.4 | 0.2 $K_4P_2O_7$ + 0.4 $Al(OH)_3$:HEDP for a total of 0.6 |
| Amount of Agent (g dry agent/$m^2$ mineral material) | 0.09 mg $Al(OH)_3$:HEDP/$m^2$ PCC | 0.06 mg $Al(OH)_3$:HEDP/$m^2$ SRGCC | 0.04 mg $Al(OH)_3$:HEDP/$m^2$ Talc | 0.08 mg $Al(OH)_3$:HEDP/$m^2$ Talc |

TABLE 5-continued

| Test | 16 | 17 | 18 | 19 |
|---|---|---|---|---|
| pH of mineral material suspension following additive system addition | 9.3 | 8.5 | 8.1 | 8 |

The invention claimed is:

1. A process for manufacturing a surface-modified mineral material in which at least part of the surface of a mineral material is modified, the process comprising the following steps:
   (a) preparing an aqueous suspension of mineral material having a solids content of from 10 to 80% by weight, based on the weight of the suspension, and at a pH of 5 to 10, wherein the mineral matter comprises calcium carbonate or talc;
   (b) contacting the aqueous suspension of mineral matter of step (a) with at least one agent so that at least part of the surface of the mineral matter is modified;
   (c) obtaining a suspension of the surface-modified mineral material from step (b) having a pH which is less than 10 and which is greater than 7 if the isoelectric point of the mineral material provided in step (a) is greater than 7, or a pH that is greater than the isoelectric point of the mineral material provided in step (a) if the isoelectric point is 7 or lower; and
   (d) subjecting the suspension of the surface-modified mineral material from step (c) to one or more of: (i) filtration on a filtration medium to form a filter cake of surface-modified mineral material, (ii) centrifugation to form a centrifuge cake of surface-modified mineral material, (iii) concentration by thermal or mechanical methods to form a concentrated surface-modified mineral material, and (iv) drying to form a dried surface-modified mineral material;
   wherein the agent is:
      (i) in the form of an aqueous solution or a stable aqueous colloid having a pH of less than 6;
      (ii) formed by mixing, in an aqueous environment, at least one phosphonic acid-comprising compound with one or more metal cations or metal-comprising cationic compounds, wherein the metal is selected from the group consisting of aluminium, zirconium, zinc, cobalt, chrome, iron, copper, tin, titanium and mixtures thereof, and wherein the phosphonic acid-comprising compound and the metal cations or metal-comprising cationic compounds are dosed such that the molar ratio of phosphonate hydroxyl groups: metal cation or metal comprising cationic compound is from 10:1 to 2:1; and
      (iii) added in step (b) in an amount corresponding to from 0.04 to 1 mg by dry weight of agent per $m^2$ of the total surface of the mineral material.

2. The process according to claim 1, wherein the suspension of step (a) has a pH of 7 to 10.

3. The process according to claim 1, wherein the suspension of step (a) has a pH of 8 to 9.

4. The process according to claim 1, wherein the mineral material is talc.

5. The process according to claim 1, wherein the mineral material comprises calcium carbonate and dolomite.

6. The process according to claim 1, wherein the mineral material comprises surface-reacted calcium carbonate.

7. The process according to claim 1, wherein the mineral material comprises calcium carbonate and one or more of dolomite, a Group IIA and/or IIIA element-comprising phyllosilicate, montmorillonite, talc, magnesite, magnesium-comprising chlorite, and kaolin clay.

8. The process according to claim 1, wherein the mineral material is a calcium carbonate.

9. The process according to claim 1, wherein the aqueous suspension of step (a) comprises less than 0.1% by weight, based on the weight of dry mineral material, of a polyacrylate-based dispersant.

10. The process according to claim 1, wherein the mineral material provided in step (a) has a BET specific surface area of 5 to 150 $m^2/g$.

11. The process according to claim 1, wherein the mineral material provided in step (a) has a BET specific surface area of 5 to 60 $m^2/g$.

12. The process according to claim 1, wherein the mineral material provided in step (a) has a BET specific surface area of 10 to 50 $m^2/g$.

13. The process according to claim 1, wherein the mineral material provided in step (a) has a weight median diameter ($d_{50}$) of 0.2 to 5 μm.

14. The process according to claim 1, wherein the mineral material provided in step (a) has a weight median diameter ($d_{50}$) of 0.5 to 2 μm.

15. The process according to claim 1, wherein the suspension in step (a) has a solids content of 20 to 80% by weight, based on the weight of the suspension.

16. The process according to claim 1, wherein the suspension in step (a) has a solids content of 40 to 75% by weight, based on the weight of the suspension.

17. The process according to claim 1, wherein the suspension in step (a) has a solids content of 50 to 70% by weight, based on the weight of the suspension.

18. The process according to claim 1, wherein the agent is dosed in step (b) in an amount corresponding to from 0.1 to 0.75 mg by dry weight of agent per $m^2$ of the total surface of the mineral material.

19. The process according to claim 1, wherein the agent is dosed in step (b) in an amount corresponding to from 0.1 to 5%, by dry weight relative to the dry weight of mineral material.

20. The process according to claim 1, wherein the agent is dosed in step (b) in an amount corresponding to from 0.15 to 0.75%, by dry weight relative to the dry weight of mineral material.

21. The process according to claim 1, wherein the agent is dosed in step (b) in an amount corresponding to from 0.15 to 0.5%, by dry weight relative to the dry weight of mineral material.

22. The process according to claim 1, wherein the agent is provided in the form of an aqueous solution having a pH of 0 to 5.

23. The process according to claim 1, wherein the agent is provided in the form of an aqueous solution having a pH of between 0.5 to 4.5.

24. The process according to claim 1, wherein the phosphonic acid-comprising compound is an alkyl diphosphonic acid.

25. The process according to claim 1, wherein the phosphonic acid-comprising compound is 1-hydroxyethane 1,1-diphosphonic acid (HEDP).

26. The process according to claim 1, wherein the phosphonic acid-comprising compound is a selected from the group consisting of methylene diphosphonic acid (MDP), hydroxymethylene diphosphonic acid (HMDP), hydroxyclomethylene diphosphonic acid (HCMDP), 1-hydroxy-3-aminopropane-1,1-diphosphonic acid (APD), aminotri(methylenephosphonic acid) (ATMP), diethylenetriaminepenta(methylenephosphonic acid) (DTPMP) and phosphonosuccinic acid (PSA).

27. The process according to claim 1, wherein the metal of the metal cation or metal-comprising cationic compound is aluminium or zirconium.

28. The process according to claim 1, wherein a base is added before and/or after the agent.

29. The process according to claim 28, wherein the base is selected from the group consisting of sodium silicate, sodium hydroxide, potassium hydroxide, lithium hydroxide, sodium aluminate, a basic polyphosphate, a basic phosphonate, and any mixture thereof.

30. The process according to claim 28, wherein the base is a basic polyphosphate or a basic phosphonate.

31. The process according to claim 28, wherein the base is a potassium salt of pyrophosphate, an alkali compound of HEDP, or a sodium and/or potassium and/or lithium compound of HEDP.

32. The process according to claim 28, wherein the base is added in an amount of greater than or equal to 0.1% by dry weight, relative to the dry weight of mineral material.

33. The process according to claim 28, wherein the base is added in an amount of from 0.2 to 0.5% by dry weight, relative to the dry weight of mineral material.

34. The process according to claim 1, wherein in step (d) the suspension of step (c) is concentrated by thermal or mechanical methods, or dried.

35. The process according to claim 1, wherein the mineral matter is precipitated calcium carbonate.

36. The process according to claim 1, wherein the mineral matter is ground calcium carbonate.

* * * * *